United States Patent
Retersdorf

(10) Patent No.: US 11,046,441 B2
(45) Date of Patent: Jun. 29, 2021

(54) ADAPTIVE PLATE-FIN HEAT EXCHANGER

(71) Applicant: Hamilton Sundstrand Corporation, Charlotte, NC (US)

(72) Inventor: Alan Retersdorf, Avon, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 28 days.

(21) Appl. No.: 16/458,732

(22) Filed: Jul. 1, 2019

(65) Prior Publication Data
US 2021/0001993 A1    Jan. 7, 2021

(51) Int. Cl.
*B64D 13/08*   (2006.01)
*B64D 13/06*   (2006.01)
*F28F 27/02*   (2006.01)

(52) U.S. Cl.
CPC .............. *B64D 13/08* (2013.01); *F28F 27/02* (2013.01); *B64D 2013/0618* (2013.01); *B64D 2013/0662* (2013.01)

(58) Field of Classification Search
CPC ............ B64D 13/06; B64D 2013/0603; B64D 2013/0618; B64D 2013/0662; B64D 13/08; F28F 27/02; F28F 2250/10; F28F 2250/102
USPC ................................... 165/97, 101
See application file for complete search history.

(56) References Cited

U.S. PATENT DOCUMENTS 3,990,504 A * 11/1976 Kolthoff, Jr. ....... F28D 1/05341
                                                        165/271
4,168,030 A * 9/1979 Timmerman ........... F01K 9/003
                                                        165/120
5,101,640 A * 4/1992 Fukushima ........... F25B 49/027
                                                        62/196.4
2007/0256817 A1* 11/2007 Toda ...................... F28F 9/026
                                                        165/143
2008/0110603 A1   5/2008 Fellague et al.
(Continued)

FOREIGN PATENT DOCUMENTS

EP   3421364 A1   1/2019
EP   3517875 A1   7/2019
(Continued)

OTHER PUBLICATIONS

Extended European Search Report for EP Application No. 19214569.6, dated Jun. 23, 2020, 7 pages.

*Primary Examiner* — Frantz F Jules
*Assistant Examiner* — Jason N Thompson
(74) *Attorney, Agent, or Firm* — Kinney & Lange, P.A.

(57) ABSTRACT

An environmental control system includes a cross-flow heat exchanger, a first valve, and a second valve. The heat exchanger includes three cores each with their own respective inlet, outlet, and cold air passage. The first inlet is fluidly connected with a hot air source. The second outlet is fluidly connected to the first outlet. The third inlet is fluidly connected to the second inlet and to a hot air destination. The first valve is fluidly connected with the hot air source, the second inlet, and the third inlet. The first valve is positioned in-line between the hot air source and the second and third inlets. The second valve is fluidly connected to the hot air destination, to the first outlet, and to the second outlet. The second valve is positioned in-line between the hot air destination and the first and second outlets.

5 Claims, 2 Drawing Sheets

(56) References Cited

U.S. PATENT DOCUMENTS

| | | | | |
|---|---|---|---|---|
| 2011/0056668 A1* | 3/2011 | Taras | ...................... | F28F 1/022 |
| | | | | 165/174 |
| 2014/0202663 A1 | 7/2014 | Shea | | |
| 2017/0268838 A1* | 9/2017 | Army | ..................... | B64D 13/02 |

FOREIGN PATENT DOCUMENTS

| | | | |
|---|---|---|---|
| EP | 3219619 A1 | 9/2019 | |
| JP | 2003240375 A | 8/2003 | |

* cited by examiner

ADAPTIVE PLATE-FIN HEAT EXCHANGER

BACKGROUND

The present disclosure relates generally to an environmental control system ("ECS") and more particularly to management of air flow into a heat exchanger assembly of an ECS.

The ECS aboard an aircraft provides conditioned air to an aircraft cabin. Conditioned air is air at a desired temperature, pressure, and humidity for aircraft passenger comfort. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it. Under conditions where the aircraft is moving fast enough, the pressure of air ramming into the aircraft is sufficient to move enough air through the ECS and over the heat exchangers to remove the excess heat.

In existing ECS's, a bleed flow control valve is typically fully open at a particular sizing design point. The bleed flow control valve then throttles down for other operating conditions where the demand for pressure/flow is less. This throttling down of the bleed flow control valve essentially results in throwing away pressure within the environmental control system.

SUMMARY

An environmental control system includes a cross-flow heat exchanger, a first valve, and a second valve. The heat exchanger includes three cores each with their own respective inlet, outlet, and cold air passage. The first inlet is fluidly connected with a hot air source. The second outlet is fluidly connected to the first outlet. The third inlet is fluidly connected to the second inlet and to a hot air destination. The first valve is fluidly connected with the hot air source, the second inlet, and the third inlet. The first valve is positioned in-line between the hot air source and the second and third inlets. The second valve is fluidly connected to the hot air destination, to the first outlet, and to the second outlet. The second valve is positioned in-line between the hot air destination and the first and second outlets.

A method of regulating a heat exchanger assembly of an environmental control system includes adjusting a first valve and a second valve to vary between a first open state and a second state position. The first open state comprises both of the first and second valves occupying an open position and the second closed state comprises both of the first and second valves occupying a closed position. A single cross-flow configuration and a triple-pass cross-flow configuration are then varied between in response to the adjustment of the first and second valves.

A heat exchanger system includes a system inlet, a system outlet, a plurality of heat exchanger cores, and a valve array. The system inlet is disposed to receive a first fluid into the heat exchanger system. The system outlet is disposed to expel the first fluid from the heat exchanger system. The plurality of heat exchanger cores is disposed between the system inlet and the system outlet. The valve array is operable in multiple modes including a first mode and a second mode. The first mode being where the valve array fluidly connects the system inlet to the system outlet via parallel flow through all of the plurality of heat exchanger cores. The second mode being where the valve array fluidly connects the system inlet to the system outlet via serial flow through each of the plurality of heat exchanger cores.

The present summary is provided only by way of example, and not limitation. Other aspects of the present disclosure will be appreciated in view of the entirety of the present disclosure, including the entire text, claims, and accompanying figures.

Figure 1:
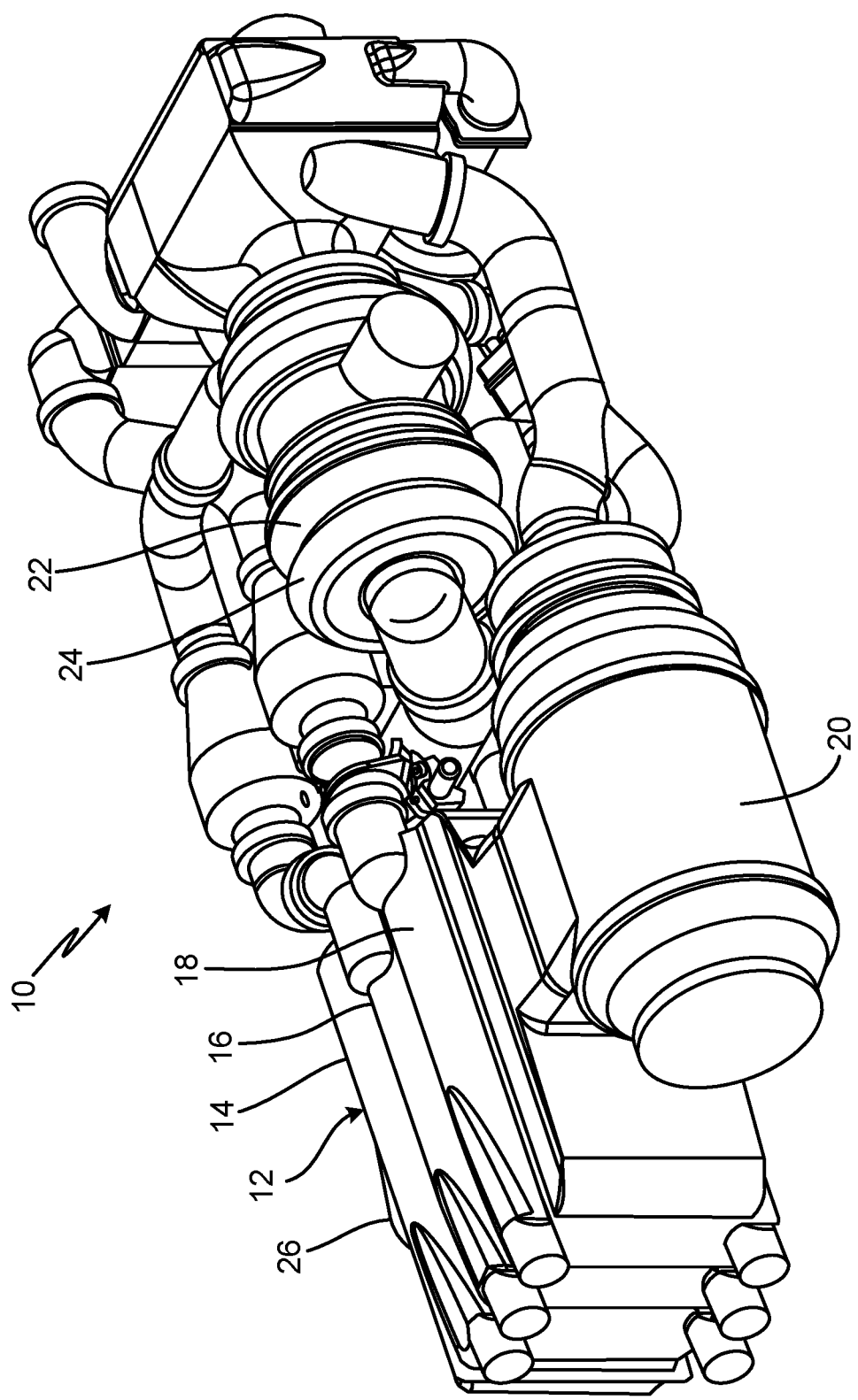
FIG. 1 is a perspective view of an ECS pack with a heat exchanger assembly.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

In the present disclosure, valves are installed upstream and downstream of the heat exchanger cores that regulate whether the heat exchanger acts as a simple cross flow (all three inlets and three outlets open) or as a three-pass cross flow. In this way, the heat exchanger assembly can be configured into a less effective low pressure drop (simple cross flow) configuration or a higher effective high pressure drop (three-pass cross flow) configuration providing the benefits of lower fuel burn and/or volume reduction.

FIG. 1 is a perspective view of ECS pack 10 and shows heat exchanger assembly 12 (with first heat exchanger 14, second heat exchanger 16, and third heat exchanger 18), FIDH 20 (fan inlet diffuser housing), ACM 22 (air cycle machine), power turbine 24, and inlet plenum 26.

ECS pack 10 is an environmental control system. In this non-limiting embodiment, ECS pack 10 is an environmental control system for an aircraft. Heat exchanger assembly 12 is an assembly of three heat exchanger units. First heat exchanger 14, second heat exchanger 16, and third heat exchanger 18 are heat exchangers each with a plurality of fins for transferring thermal energy between working fluids. In this example, first heat exchanger 14 can be a chiller heat exchanger, second heat exchanger 16 can be a fresh air heat exchanger, and third heat exchanger 18 can be a bleed air heat exchanger. FIDH 20 is a fan inlet diffuser housing. ACM 22 is an air cycle machine. Power turbine 24 is a rotary device including a component configured to create power by rotating in response to a fluid flowing through power turbine 24. Inlet plenum 26 is an inlet housing or conduit.

ECS pack 10 can be mounted within a portion of an aircraft. ECS pack 10 can be fluidly connected to numerous fluid sources such as an engine, an auxiliary power unit, a source of ambient air, a cabin, a cockpit, and/or a source of ram air of the aircraft. Heat exchanger assembly 12 is mounted within a portion of ECS pack 10. First heat exchanger 14 is disposed adjacent to and in contact with second heat exchanger 16. First heat exchanger 14 is fluidly connected to inlet plenum 26 via a cold circuit of heat exchanger assembly 12 that passes through each of first heat exchanger 14, second heat exchanger 16, and third heat exchanger 18 (as will be discussed with respect to FIG. 2).

Second heat exchanger 16 is disposed adjacent to and in contact with first heat exchanger 14 and third heat exchanger 18. Second heat exchanger 16 can be fluidly connected to a fresh air compressor (not shown) and to a condenser re-heater (not shown) of ECS pack 10. Third heat exchanger 18 is disposed adjacent to and in contact with second heat exchanger 16 and FIDH 20. Third heat exchanger 18 can be fluidly connected to a bleed outflow heat exchanger (not shown) and to first heat exchanger 14 of ECS pack 10.

FIDH 20 is mounted to a side of third heat exchanger 18 and to a turbo fan (not shown) of ECS pack 10. FIDH 20 can be fluidly connected to the cold ram air circuit that passes through heat exchanger assembly 12. In other non-limiting embodiments, FIDH 20 can be replaced with another component or removed all together from ECS pack 10. ACM 22 is physically and fluidly connected to power turbine 24. Power turbine 24 is mounted to a portion of ACM 22 and is fluidly connected to ACM 22 and to inlet plenum 26. Inlet plenum 26 is mounted to first heat exchanger 14. Inlet plenum 26 is fluidly connected to first heat exchanger 14, to a source of ram air, and to power turbine 24.

ECS pack 10 controls and manages the transfer of thermal energy and pressures among the different sources of air throughout the aircraft. Heat exchanger assembly 12 (with first heat exchanger 14, second heat exchanger 16, and third heat exchanger 18) functions to cool the air flowing through each of first heat exchanger 14, second heat exchanger 16, and third heat exchanger 18. As will be discussed with respect to FIG. 2, heat exchanger assembly 12 includes three independent hot circuits that are in cross flow communication with a single (cold) ram air circuit.

FIDH 20 receives and transfers air away from the cold ram air circuit of heat exchanger assembly 12. ACM 22 functions as an air conditioning pack to change to the pressure, temperature, and/or humidity of air passing through ACM 22. Inlet plenum 26 receives cooling air from two separate sources and transfers that air into heat exchanger assembly 12. The two sources can be ambient ram air and exhaust air from power turbine 24.

An additional example of an environmental control system can be found in the following co-pending application: U.S. patent application Ser. No. 15/879,192 filed on Jan. 24, 2018, which is herein incorporated by reference in its entirety.

Figure 2:
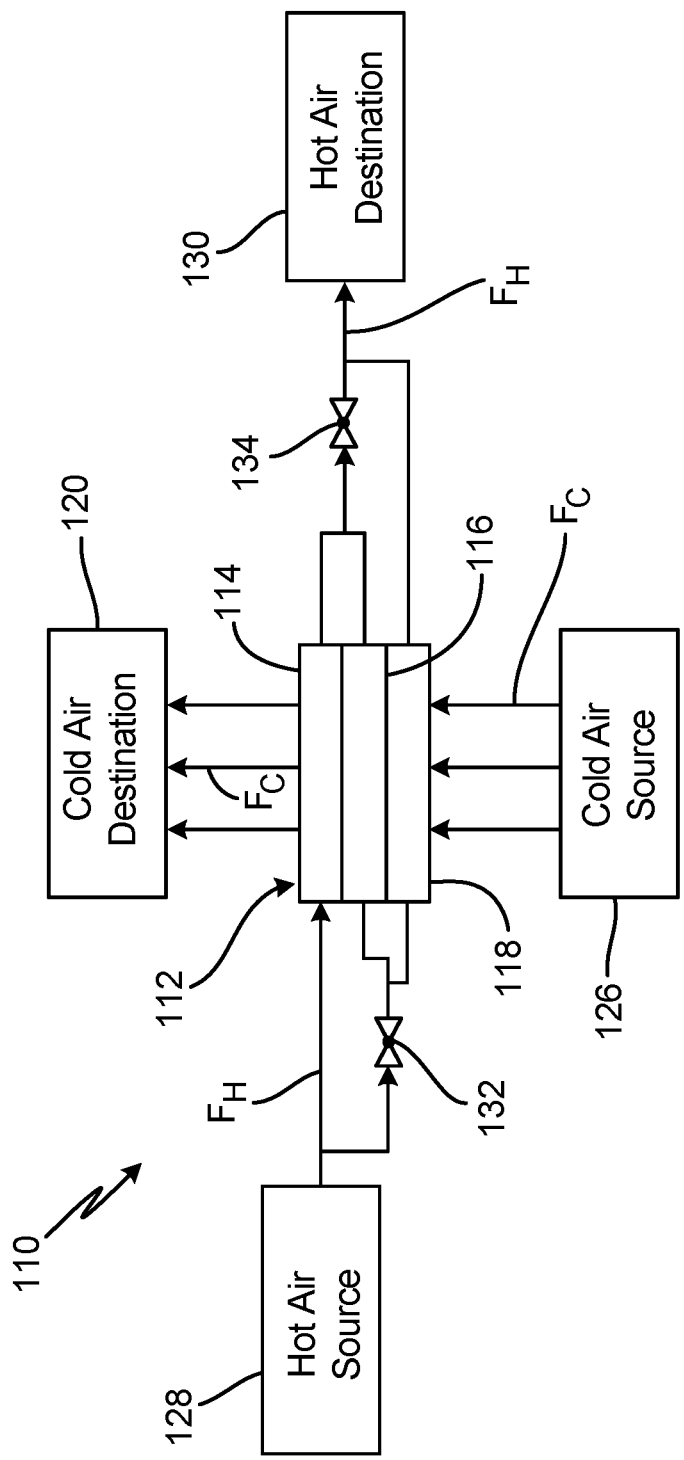
FIG. 2 is a simplified schematic view of the heat exchanger with upstream and downstream vales.

FIG. 2 is a simplified schematic view of ECS pack 110 with heat exchanger assembly 112 (including first heat exchanger 114, second heat exchanger 116, and third heat exchanger 118), cold air destination 122, cold air source 126, hot air source 128, hot air destination 130, first valve 132, second valve 134, flow $F_C$ of cold air, and flow $F_H$ of hot air. ECS pack 110, heat exchanger assembly 112, first heat exchanger 114, second heat exchanger 116, and third heat exchanger 118 shown in FIG. 2 correspond to the same or similar elements as ECS pack 10, heat exchanger assembly 12, first heat exchanger 14, second heat exchanger 16, and third heat exchanger 18, respectively, shown in and discussed with respect to FIG. 1.

In this non-limiting embodiment, heat exchanger assembly 112 can be a pre-cooler heat exchanger. In this example, first heat exchanger 114, second heat exchanger 116, and third heat exchanger 118 each include an inlet, an outlet, and a cold air passage. For example, the cold air passages of the first, second, and third heat exchangers 114, 116, and 118 can be in series flow communication with each other. In some examples, first heat exchanger 114, second heat exchanger 116, and third heat exchanger 118 can be referred to as heat exchanger passes, hot passes, or (hot) cores. In one non-limiting embodiment, first, second, and third heat exchangers 114, 116, and 118 can be a plurality of heat exchanger cores.

Cold air destination 122 is a destination for flow $F_C$ of cold air. In one example, cold air destination 122 can be ACM 22 (shown in FIG. 1). Cold air source 126 is a source of flow $F_C$ of cold air. In one example, cold air source 126 can be inlet plenum 26 (shown in FIG. 1). In another example, cold air source 126 can be a source of RAM air from the aircraft. Hot air source 128 is a source of flow $F_H$ of hot air. In one example, hot air source 128 can be referred to as a system inlet of heat exchanger system 112. Hot air destination 130 is a destination of flow $F_H$ of hot air. In one example, hot air destination 130 can be referred to as a system outlet of heat exchanger system 112.

First valve 132 and second valve 134 are devices configured to regulate (e.g., allow, prevent, limit) a flow of a fluid such as air. In one example, first valve 132 and second valve 134 can be referred to as a valve array. Flow $F_C$ of cold air and flow $F_H$ of hot air are streams of airflow. In this example, flow $F_C$ is a flow of cold air and flow $F_H$ is a flow of hot air (i.e., flow $F_C$ of cold air has a lesser amount of thermal energy than flow $F_H$ of hot air).

Heat exchanger assembly 112 is configured in a cross-flow arrangement such that the direction of flow $F_C$ cold air through heat exchanger assembly 12 is orthogonal to flow $F_H$ of hot air through heat exchanger assembly 112. Cold air destination 122 is fluidly connected to and located downstream (e.g., a downstream direction of flow $F_C$ of cold air that is shown as down to up in FIG. 2) from first heat exchanger 114. Cold air source 126 is fluidly connected to and located upstream (e.g., an upstream direction of flow $F_C$ of cold air that is shown as up to down in FIG. 2) from third heat exchanger 118.

Hot air source 128 is fluidly connected to and located upstream (e.g., an upstream direction of flow $F_H$ of hot air that is shown as right to left in FIG. 2) from first heat exchanger 114. Hot air source 128 is also fluidly connected to and located upstream from second and third heat exchangers 116 and 118, with first valve 132 being connected in-line between hot air source 128 and second and third heat exchangers 116 and 118. Hot air destination 130 is fluidly connected to and located downstream (e.g., a downstream direction of flow $F_H$ of hot air that is shown as left to right in FIG. 2) from first heat exchanger 114. Hot air destination 130 is also connected to and located downstream from first and second heat exchangers 114 and 116, with second valve 134 being connected in-line between hot air destination 130 and first and second heat exchangers 114 and 116.

First valve 132 is fluidly connected in-line between hot air source 128 and second and third heat exchangers 116 and 118. In this example, first valve 132 is shown as a single valve. Second valve 134 is fluidly connected in-line between hot air destination 130 and first and second heat exchangers 114 and 116. Flow $F_C$ of cold air flows from cold air source 126 into heat exchanger assembly 112, through passages formed by cold fins in each of first, second, and third heat exchangers 114, 116, and 118, and flows out of heat exchanger assembly 112 to cold air destination 120. Flow $F_H$ of hot air flows from hot air source 128, through heat exchanger assembly 112, and to hot air destination 130.

Each of first and second valves 132 and 134 are configured to occupy either a first open state (e.g., mode) or a second closed state (e.g., mode). When first and second valves 132 and 134 occupy the first open state, heat exchanger assembly 112 is configured as simple cross-flow heat exchanger such that first, second, and third heat exchangers 114, 116, and 118 are in parallel flow alignment with each other. Put another way, the valve array (i.e., first and second valves 132 and 134) fluidly connects the system inlet (i.e., hot air source 128) to the system outlet (i.e., hot air destination 130) via parallel flow through all of the plurality of heat exchanger cores (i.e., first, second, and third heat exchangers 114, 116, and 118). For example, the first closed position of first and second valves 132 and 134 causes flow $F_H$ of hot air to pass from the first outlet of first heat exchanger 114 to the second outlet of second heat exchanger 116, to pass through second heat exchanger 116, to pass out of the second inlet of second heat exchanger 116 to the third inlet of third heat exchanger 118, to pass through third heat exchanger 118, to pass out of the third outlet of the third heat exchanger 118, and to hot air destination 130.

In the second close state, heat exchanger assembly 112 is configured as a triple pass cross-flow heat exchanger such that first, second, and third heat exchangers 114, 116, and 118 are configured in a series flow alignment. Put another way, the valve array (i.e., first and second valves 132 and 134) fluidly connects the system inlet (i.e., hot air source 128) to the system outlet (i.e., hot air destination 130) via serial flow through each of the plurality of heat exchanger cores (i.e., first, second, and third heat exchangers 114, 116, and 118). For example, the second open position of first and second valves 132 and 134 causes flow $F_H$ of hot air from hot air source 128 to pass through each of first, second, and third heat exchangers 114, 116, and 118 in a same downstream direction (e.g., shown as left to right in FIG. 2) towards hot air destination 130.

In one non-limiting embodiment, a method of regulating heat exchanger assembly 112 includes adjusting first valve 132 and second valve 134 to vary between a first closed position and a second open position. In response to the adjustment of first and second valves 132 and 134, heat exchanger assembly 112 can be varied between a single cross-flow configuration and a triple-pass cross-flow configuration. For example, adjusting first valve 132 and second valve 134 to occupy the first closed position comprises routing flow $F_H$ of hot air to pass from the first outlet of first heat exchanger 114 to the second outlet of second heat exchanger 116, to pass through second heat exchanger 116, to pass out of the second inlet of second heat exchanger 116 to the third inlet of third heat exchanger 118, to pass through third heat exchanger 118, to pass out of the third outlet of the third heat exchanger 118, and to hot air destination 130.

In another example, adjusting first valve 132 and second valve 134 to occupy the second open position comprises routing flow $F_H$ of hot air hot air source 128 to pass through each of first, second, and third heat exchangers 114, 116, and 118 in the same downstream direction towards hot air destination 130.

The adaptive features of heat exchanger systems 12/112 allow for operability and sizing flexibility of ECS packs 10/110. Instead of regulating flow only with a flow control valve and throwing away pressure when the pressure is not needed, heat exchanger systems 12/112 can be configured into a less effective low pressure drop (simple cross flow) configuration or a higher effective high pressure drop (3 pass cross flow) configuration. The overall benefits of heat exchanger systems 12/112 with first and second valves 132 and 134 are lower fuel burn (e.g., of the aircraft) and/or a reduction in pressure drop across ECS packs 10/110.

Discussion of Possible Embodiments

An environmental control system includes a cross-flow heat exchanger, a first valve, and a second valve. The heat exchanger includes three cores each with their own respective inlet, outlet, and cold air passage. The first inlet is fluidly connected with a hot air source. The second outlet is fluidly connected to the first outlet. The third inlet is fluidly connected to the second inlet and to a hot air destination. The first valve is fluidly connected with the hot air source, the second inlet, and the third inlet. The first valve is positioned in-line between the hot air source and the second and third inlets. The second valve is fluidly connected to the hot air destination, to the first outlet, and to the second outlet. The second valve is positioned in-line between the hot air destination and the first and second outlets.

The environmental control system of the preceding paragraph can optionally include, additionally and/or alternatively, any one or more of the following features, configurations and/or additional components.

Each of the first and second valves can be configured to occupy either a first open state or a second closed state.

With the first and second valves occupying the first open state, the heat exchanger assembly can be configured as simple cross-flow heat exchanger assembly such that the first, second, and/or third cores can be in parallel flow alignment with each other.

The first open state of the first and second valves can cause the flow of hot air from the hot air source to pass through each of the first, second, and/or third cores in a same downstream direction towards the hot air destination.

The second closed state of the first and second valves can cause the flow of hot air to pass from the first outlet to the second outlet, to pass through the second core, to pass out of the second inlet to the third inlet, to pass through the third core, to pass out of the third outlet and to the hot air destination.

With the first and second valves occupying the second closed state, the heat exchanger assembly can be configured as a triple pass cross-flow heat exchanger assembly such that the first, second, and/or third cores can be configured in a series flow alignment.

A method of regulating a heat exchanger assembly of an environmental control system includes adjusting a first valve and a second valve to vary between a first open state and a second state position. The first open state comprises both of the first and second valves occupying an open position and the second closed state comprises both of the first and second valves occupying a closed position. A single cross-flow configuration and a triple-pass cross-flow configuration are then varied between in response to the adjustment of the first and second valves.

The method of the preceding paragraph can optionally include, additionally and/or alternatively, any one or more of the following steps, features, configurations and/or additional components.

The first valve can be fluidly connected with the hot air source, the second inlet, and/or the third inlet, wherein the first valve can be positioned in-line between the hot air source and the second and third inlets, and/or the second valve can be fluidly connected to the hot air destination, to the first outlet, and/or to the second outlet, wherein the second valve can be positioned in-line between the hot air destination and the first and second outlets.

A flow of hot air can be routed from the hot air source to pass through each of the first, second, and/or third cores in a same downstream direction towards the hot air destination.

A flow of hot air can be routed to pass from the first outlet to the second outlet, to pass through the second core, to pass out of the second inlet to the third inlet, to pass through the third core, to pass out of the third outlet and to the hot air destination.

A heat exchanger system includes a system inlet, a system outlet, a plurality of heat exchanger cores, and a valve array. The system inlet is disposed to receive a first fluid into the heat exchanger system. The system outlet is disposed to expel the first fluid from the heat exchanger system. The plurality of heat exchanger cores is disposed between the system inlet and the system outlet. The valve array is operable in multiple modes including a first mode and a second mode. The first mode being where the valve array fluidly connects the system inlet to the system outlet via parallel flow through all of the plurality of heat exchanger cores. The second mode being where the valve array fluidly connects the system inlet to the system outlet via serial flow through each of the plurality of heat exchanger cores.

The heat exchanger system of the preceding paragraph can optionally include, additionally and/or alternatively, any one or more of the following features, configurations and/or additional components.

The first mode can cause the first fluid from the system inlet to pass through each of the plurality of heat exchanger cores in a same downstream direction towards the system outlet.

The plurality of the heat exchanger cores can comprise a first, a second, and/or a third heat exchanger cores.

The second mode can cause the first fluid from the system inlet to pass to an inlet of a first heat exchanger core, to pass through the first heat exchanger core, to pass out of an outlet of the first heat exchanger core, to pass into an outlet of the second heat exchanger core, to pass through the second heat exchanger core, to pass from an inlet of the second heat exchanger core to an inlet of the third heat exchanger core, to pass through the third heat exchanger core, to pass out of an outlet of the third heat exchanger core, and/or to pass to the system outlet.

A first valve fluidly can be connected with the system inlet, an inlet of the second heat exchanger core, and/or an inlet of the third heat exchanger core, wherein the first valve can be positioned in-line between the system inlet and/or the inlets of the second and third heat exchangers, and a second valve fluidly can be connected to the system outlet, to an outlet of the first heat exchanger core, and/or to an outlet of the second heat exchanger core, wherein the second valve can be positioned in-line between the system outlet and/or the outlets of the first and second heat exchanger cores.

With the valve array occupying the second mode, the heat exchanger assembly can be configured as a triple-pass cross-flow heat exchanger assembly.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An environmental control system for cooling air in a cabin of an aircraft, the environment control system comprising:
   a heat exchanger assembly comprising:
      a first core comprising:
         a first end connected to a hot air source by a first hot air line;
         a second end; and
         a first cold air passage;
      a second core comprising:
         a first end adjacent the first end of the first core;
         a second end adjacent the second end of the first core, wherein the second end of the second core is fluidly connected to the second end of the first core by a second hot air line; and
         a second cold air passage;
      a third core comprising:
         a first end connected to the first end of the second core by a third hot air line;
         a second end, wherein the second end of the third core is fluidly connected to a hot air destination by a fourth hot air line; and
         a third cold air passage in series flow communication with the first and second air passages, wherein the heat exchanger assembly is configured in a cross-flow arrangement such that a direction of a cold air flow through the heat exchanger assembly is orthogonal to a flow of hot air through the heat exchanger assembly;
   a first valve located along a fifth hot air line that extends from the hot air source to the third hot air line; and
   a second valve located along a sixth hot air line that extends from the second hot air line to the hot air destination,
   wherein each of the first and second valves are configured to be positioned in one of a first open state and a second closed state,
   wherein, when the first and second valves are in the first open state, a flow of hot air is from the hot air source through each of the first, second, and third cores in parallel in the same direction towards the hot air destination, and
   wherein, when the first and second valves are in the second closed state, the flow of hot air is from the hot air source through the first hot air line to the first core, out the second end of the first core and through the second hot air line to the second end of the second core, through the second core to the first end of the second core, out the first end of the second core and through the third hot air line to the first end of the third core, through the third core to the second end of the third core, and out the second end of the third core and through the fourth hot air line to the hot air destination such that the hot air flows through the first, second, and third cores in series in alternating directions.

2. The environmental control system of claim 1, wherein when the first and second valves occupy the first open state, the heat exchanger assembly is configured as simple cross-flow heat exchanger assembly.

3. The environmental control system of claim 1, wherein when the first and second valves occupy the second closed state, the heat exchanger assembly is configured as a triple pass cross-flow heat exchanger assembly.

4. A method of regulating a heat exchanger assembly of an environmental control system for cooling air in a cabin of an aircraft, the method comprising:

adjusting a first valve and a second valve to vary between a first open state and a second closed state, wherein the first open state comprises both of the first and second valves occupying an open position, wherein the second closed state comprises both of the first and second valves occupying a closed position, wherein the heat exchanger assembly comprises:
  a first core comprising:
    a first end connected to a hot air source by a first hot air line;
    a second end; and
    a first cold air passage;
  a second core comprising:
    a first end adjacent the first end of the first core;
    a second end adjacent the second end of the first core, wherein the second end of the second core is fluidly connected to the second end of the first core by a second hot air line; and
    a second cold air passage;
  a third core comprising:
    a first end connected to the first end of the second core by a third hot air line;
    a second end, wherein the second end of the third core is fluidly connected to a hot air destination by a fourth hot air line; and
    a third cold air passage in series flow communication with the first and second air passages, wherein the heat exchanger assembly is configured in a cross-flow arrangement such that a direction of a cold air flow through the heat exchanger assembly is orthogonal to a flow of hot air through the heat exchanger assembly;
  the first valve located along a fifth hot air line that extends from the hot air source to the third hot air line; and
  the second valve located along a sixth hot air line that extends from the second hot air line to the hot air destination;
varying between a single cross-flow configuration and a triple-pass cross-flow configuration in response to the adjustment of the first and second valves,
wherein, when the first and second valves are in the second closed state, the flow of hot air is from the hot air source through the first hot air line to the first core, out the second end of the first core and through the second hot air line to the second end of the second core, through the second core to the first end of the second core, out the first end of the second core and through the third hot air line to the first end of the third core, through the third core to the second end of the third core, and out the second end of the third core and through the fourth hot air line to the hot air destination such that the hot air flows through the first, second, and third cores in series in alternating directions.

5. The method of claim 4, wherein adjusting the first valve and the second valve to occupy the first open state comprises routing a flow of hot air from the hot air source to pass through each of the first, second, and third cores in a same downstream direction towards the hot air destination.

\* \* \* \* \*